(12) United States Patent
Unten et al.

(10) Patent No.: US 10,068,339 B2
(45) Date of Patent: Sep. 4, 2018

(54) IMAGE PROCESSING DEVICE, IMAGE PROCESSING SYSTEM, IMAGE PROCESSING METHOD AND IMAGE PROCESSING PROGRAM

(71) Applicant: Toppan Printing Co., Ltd., Taito-ku (JP)

(72) Inventors: Hiroki Unten, Taito-ku (JP); Tatsuya Ishii, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 14/864,267

(22) Filed: Sep. 24, 2015

(65) Prior Publication Data

US 2016/0012603 A1 Jan. 14, 2016

Related U.S. Application Data

(63) Continuation of application No. PCT/JP2014/058562, filed on Mar. 26, 2014.

(30) Foreign Application Priority Data

Mar. 26, 2013 (JP) ................................. 2013-064829

(51) Int. Cl.
*G06K 9/00* (2006.01)
*G06T 7/00* (2017.01)
(Continued)

(52) U.S. Cl.
CPC .......... *G06T 7/0075* (2013.01); *G06T 1/0007* (2013.01); *G06T 5/003* (2013.01); *G06T 7/593* (2017.01); *G06T 2207/20024* (2013.01)

(58) Field of Classification Search
None
See application file for complete search history.

(56) References Cited

U.S. PATENT DOCUMENTS

2006/0239539 A1* 10/2006 Kochi .................... G01C 11/02
382/154
2007/0252907 A1* 11/2007 Hsu .................... H04N 5/23222
348/248

(Continued)

FOREIGN PATENT DOCUMENTS

| JP | 2008-198193 A | 8/2008 |
| JP | 2010-134318 A | 6/2010 |

(Continued)

OTHER PUBLICATIONS

International Search Report dated May 27, 2014 in PCT/JP2014/058562, filed Mar. 26, 2014.

(Continued)

*Primary Examiner* — Hadi Akhavannik
(74) *Attorney, Agent, or Firm* — Oblon, McClelland, Maier & Neustadt, L.L.P.

(57) ABSTRACT

An image processing device includes an acquiring unit that acquires plural images in which an object is captured from multiple directions; a calculation unit that calculates a value representing a quality of the images; a determining unit that determines a process for measuring a surface shape of the object depending on the quality of the images; and an execution unit that executes the process which is determined.

18 Claims, 5 Drawing Sheets

(51) Int. Cl.
*G06T 1/00* (2006.01)
*G06T 5/00* (2006.01)
*G06T 7/593* (2017.01)

(56) References Cited

U.S. PATENT DOCUMENTS

| | | | |
|---|---|---|---|
| 2008/0175448 A1* | 7/2008 | Fujiwara | G06K 9/00208 382/118 |
| 2008/0259170 A1* | 10/2008 | Hatanaka | H04N 5/23248 348/208.6 |
| 2010/0079626 A1* | 4/2010 | Hatakeyama | G06T 5/006 348/241 |
| 2010/0111429 A1* | 5/2010 | Wang | G06T 3/4038 382/233 |
| 2011/0135144 A1* | 6/2011 | Franklin, Jr. | G06K 7/10881 382/100 |
| 2011/0206246 A1* | 8/2011 | Wolf | G06F 19/24 382/118 |
| 2011/0242372 A1* | 10/2011 | Kosaka | H04N 5/3572 348/242 |
| 2012/0236168 A1* | 9/2012 | Tsutsumi | G06T 5/50 348/208.4 |
| 2012/0307093 A1* | 12/2012 | Miyoshi | G06T 5/50 348/218.1 |

FOREIGN PATENT DOCUMENTS

| | | |
|---|---|---|
| JP | 2012-16573 A | 1/2012 |
| WO | WO 2010/140513 A1 | 12/2010 |
| WO | WO 2013/035847 A1 | 3/2013 |

OTHER PUBLICATIONS

Unten et al., "A practical VR-model Generation Method by utilizing Moving-shots with Stereo Camera-Stereo Moving-shot Modeling System (SM2S)-",The Virtual Reality Society Japan, Journal vol. 12, No. 2, 2007, 9 pages. (with English abstract).

Extended European Search Report dated Oct. 12, 2016 in Patent Application No. 14776350.2.

Fei Dai, et al., "Generating the Sparse Point Cloud of a Civil Infrastructure Scene Using a Single Video Camera Under Practical Constraints", Proceedings of the 2011 Winter Simulation Conference, XP058028695, 2011, pp. 3593-3604.

\* cited by examiner

| Image Number | Pixel Value Information | Region | Acceleration | Image Angle | Shutter Speed | ... |
|---|---|---|---|---|---|---|
| Sp1 | P1 | B1 | A1 | V1 | E1 | ... |
| Sp2 | P2 | B2 | A2 | V2 | E2 | ... |
| Sp3 | P3 | B3 | A3 | V3 | E3 | ... |
| ⋮ | ⋮ | ⋮ | ⋮ | ⋮ | ⋮ | ⋮ |

IMAGE PROCESSING DEVICE, IMAGE PROCESSING SYSTEM, IMAGE PROCESSING METHOD AND IMAGE PROCESSING PROGRAM

CROSS-REFERENCE TO RELATED APPLICATIONS

The present application is a continuation of International Application No. PCT/JP2014/058562, filed Mar. 26, 2014, which is based upon and claims the benefits of priority to Japanese Application No. 2013-064829, filed Mar. 26, 2013. The entire contents of these applications are incorporated herein by reference.

BACKGROUND OF THE INVENTION

Field of the Invention

The present invention relates to an image processing device, an image processing system, an image processing method and an image processing program.

Discussion of the Background

A three-dimensional restoration technique has been used. The three-dimensional restoration technique measures a surface shape of an object based on a plurality of images (hereinafter referred to as multiple viewpoint images) in which the object is captured from multiple directions, thereby restoring the object. In recent years, three-dimensional restoration techniques have advanced so that a mesh model (i.e., three-dimensional shaped model) representing a surface shape of a restored object can be accurately produced based only on the multiple viewpoint images.

The three-dimensional restoration technique using multiple viewpoint images is attracting attention from wide areas, for example, not only the research community but also digital archives for cultural properties or the entertainment industry (refer to non-patent literature 1).
Non-patent literature 1: Hiroki Unten and three others, A practical VR-model generation method by utilizing moving-shots with stereo camera: Stereo Moving-shot Modeling System (SM2S), the virtual reality society Japan, journal Vol. 12, No. 2, 2007

SUMMARY OF THE INVENTION

According to one aspect of the present invention, an image processing device includes an acquiring unit that acquires plural images in which an object is captured from multiple directions; a calculation unit that calculates a value representing a quality of the images; a determining unit that determines a process for measuring a surface shape of the object depending on the quality of the images; and an execution unit that executes the process which is determined.

According to another aspect of the present invention, a method of processing an image includes calculating a value representing a quality of plural images in which an object is captured from multiple directions, determining a process for measuring a surface shape of the object depending on the value representing the quality of the images, and executing the process which is determined.

According to another aspect of the present invention, a non-transitory computer-readable medium including computer executable instructions, wherein the instructions, when executed by a computer, cause the computer to perform a method of processing an image, includes calculating a value representing a quality of plural images in which an object is captured from multiple directions, determining a process for measuring a surface shape of the object depending on the value representing the quality of the images, and executing the process which is determined.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
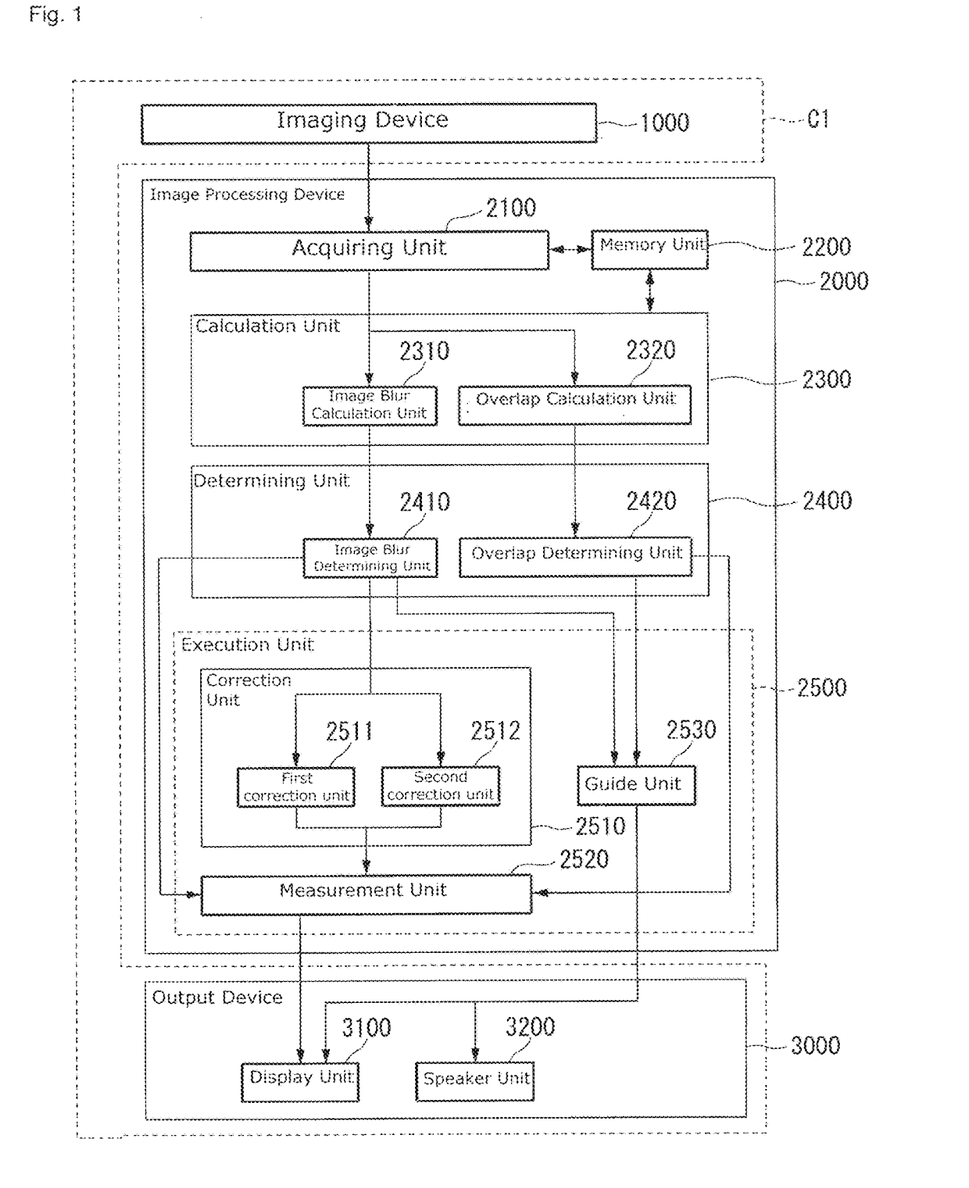
FIG. 1 is a block diagram showing an example of configuration of an image processing system according to an embodiment of the present invention.

Hereinafter, with reference to the drawings, an embodiment of the present invention will now be described in detail. In FIG. 1, an example configuration of an image processing system is shown as a block diagram. The image processing system is provided with an imaging device 1000, an image processing device 2000 and an output device 3000. The imaging device 1000 and the output device 3000 may be configured as separated devices or as an imaging device C1 that integrates an output device.

The imaging device 1000 is held by user who goes around an object (e.g., a Haniwa figure) of which a surface image is captured and can be moved. The imaging device 1000 is operated by this user (for example, by pressing a shutter button), thereby capturing, from multiple directions, the object of which the surface image is captured.

The captured image may be captured with either static image format or dynamic image format. The imaging device 1000 may capture a single image by one operation. In the following explanation, a case is described where a plurality of image sensors and an optical system device capture a plurality of images that constitute a stereo pair (hereinafter referred to as stereo image) in one operation and output the captured stereo image to the image processing device 2000.

The imaging device 1 may include a sensor. This sensor, for example, detects acceleration applied to the present device when capturing the object. The imaging device 1000 may correlate information representing the acceleration with the stereo image and output the information to the image processing device 2000. Also, the imaging device 1000 may correlate information representing the angle of view and information representing shutter speed which are used as a camera parameter when the object is captured, with the stereo image, and outputs the information to the image processing device 2000.

The image processing device 2000 is provided with an acquiring unit 2100, a memory unit 2200, a calculation unit 2300, a determining unit 2400 and an execution unit 2500. The acquiring unit 2100 acquires stereo image from the imaging device 1000 and adds image numbers to respective images that constitute the acquired stereo image. The acquiring unit 2100 stores pixel value information of images that constitute the stereo image, as an item of the image information (described later with reference to FIG. 2) at every image number, into the memory unit 2200.

The acquiring unit 2100 may acquire information representing acceleration, information representing angle of view and information representing shutter speed from the imaging device 1000. The acquiring unit 2100 may store information representing acceleration, information representing angle of view and information representing shutter speed, as an item of the image information for every image number, into the memory unit 2200.

The memory unit 2200 stores the image information. The image information items include an image number and a region. The pixel value information represents information of pixel value of the image that constitutes the stereo image as a two-dimensional image. The region represents a region defined on an image included in the stereo image. The defined region will be described later in detail with reference to FIG. 3. Specifically, the image information items may include information representing acceleration, information representing angle of view and information representing shutter speed which are acquired from the imaging device 1000.

Figure 2:
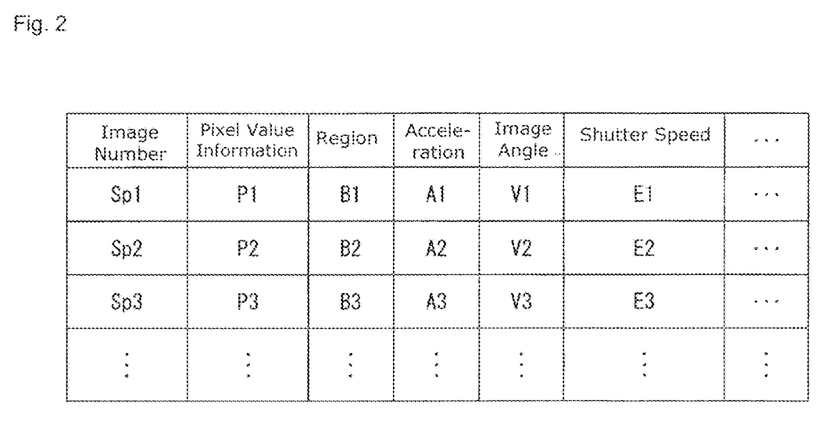
FIG. 2 is a table showing an example of image information according to an embodiment of the present invention.

FIG. 2 shows an example of the image information in a table. In FIG. 2, a correlation between a pixel number 'SP1', a pixel value information 'P1', a region 'B1', an acceleration 'A1', an angle of image 'V1' and a shutter speed 'E1' is illustrated. Similarly, a correlation between a pixel number 'SP2', a pixel value information 'P2', a region 'B2', an acceleration 'A2', an angle of image 'V2' and a shutter speed 'E2' is illustrated. Moreover, a correlation between a pixel number 'SP3', a pixel value information 'P3', a region 'B3', an acceleration 'A3', an angle of image 'V3' and a shutter speed 'E3' is illustrated.

With reference to FIG. 1, a configuration example of the image processing system will be further described. The calculation unit 2300 includes an image blur calculation unit 2310 and an overlap calculation unit 2320. The image blur calculation unit 2310 receives the image information (refer to FIG. 2) from the acquiring unit 2100. The image blur calculation unit 2310 calculates, based on the pixel value information, a value representing the degree of image blur as a quality of the image. Since the image blur calculation unit 2310 calculates a value representing the degree of image blur, based on the pixel value information (information of the pixel value of an image that constitutes a stereo image which is a two dimensional image), compared with a case when calculating based on the pixel value of a three-dimensional image, the degree of image blur can be calculated with a smaller amount of processing.

In the image blur calculation unit 2310, for example, a matching process of pixel values may be performed for every image based on the pixel value information, thereby calculating a value representing the degree of image blur. The image blur calculation unit 2310 may calculate movement per unit time of the imaging device 1000 based on acceleration, and calculate a value representing the degree of image blur based on the calculated movement, an angle of image and a shutter speed of the imaging device 1000.

The overlap calculation unit 2320 receives image information (refer to FIG. 2) from the acquiring unit 2100. The overlap calculation unit 2320 calculates a value representing an overlap ratio of captured images which shows quality of the image, based on the pixel value information (e.g., pixel value of a feature point in the image and information representing the coordinate). Since the overlap calculation unit 2320 calculates a value representing an overlap ratio of images based on the pixel value information (pixel value information corresponding to image that constitutes stereo image which is a two dimensional image), comparing with a case when calculating based on the pixel value of a three-dimensional image, a value representing an overlap ratio of images can be calculated with a smaller amount of processing.

Figure 3:
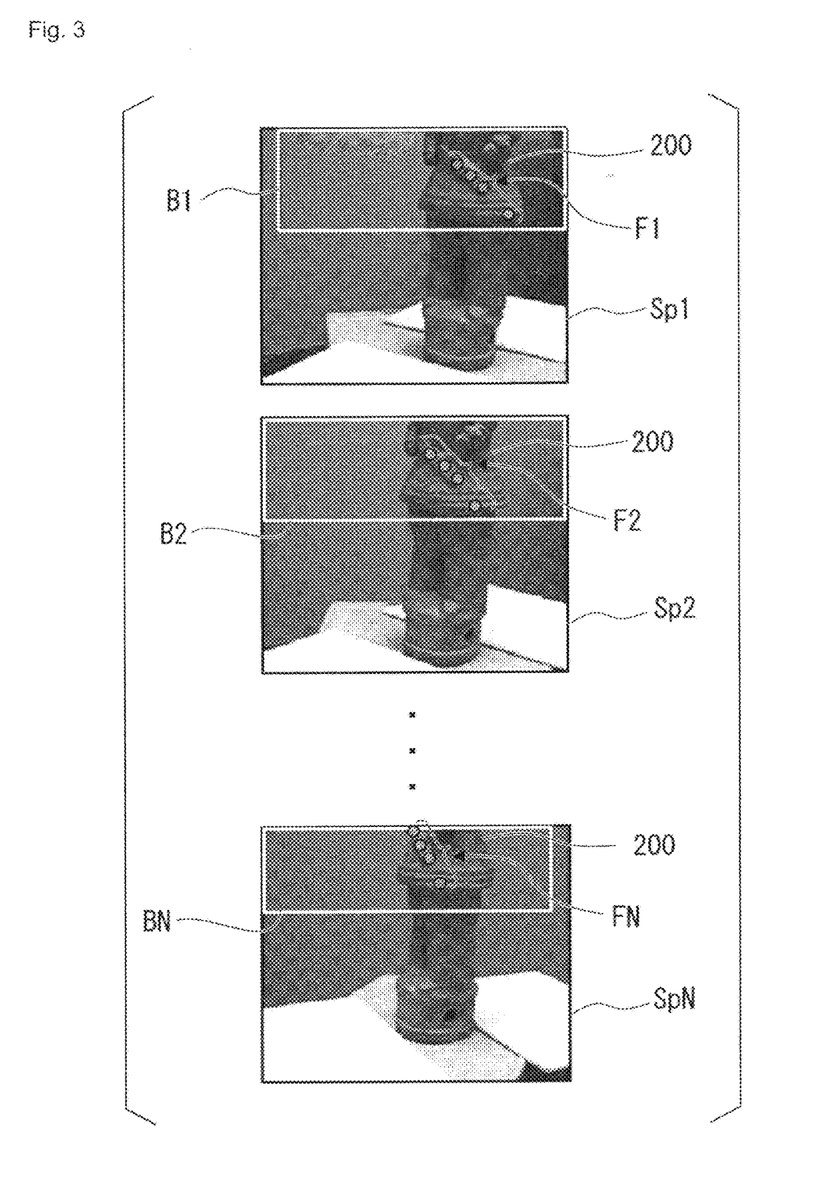
FIG. 3 is a diagram showing an example of regions defined on an image, based on a feature point according to an embodiment of the present invention.

FIG. 3 shows an example of region defined on the image based on the feature point. The overlap calculation unit 2320 (refer to FIG. 1) extracts feature point group FN, where N is a sign showing the number of pairs of the stereo image, from either the left image of the stereo image or the right image of the stereo image.

The overlap calculation unit 2330 produces feature points having the same three-dimensional point correlated with each other in every image, the feature points being from between a feature point group FN extracted from an image SpN acquired at the present time and a feature point group F (n−1) extracted from an image group Sp (n−1), where n represents 1 to N, acquired at the previous time. For example, this correlation may be applied to left side images in the stereo image or applied to right side images in the stereo image. In FIG. 3, the images Sp1 to SpN show left side images in the stereo image.

The overlap calculation unit 2320 defines, for every image, a region Bn including a feature point group Mn which is succeeded in the correlation. For example, the shape of the defined region may be a rectangle. The overlap calculation unit 2320 calculates, based on the defined region Bn, a value Rn representing the overlap ratio of images for every image. For example, the value representing the overlap ratio may be defined as a ratio of the area corresponding to the region Bn defined on the image based on the feature point with respect to the area corresponding to the frame (entire region) of the image Spn where the region Bn is defined. The overlap calculation unit 2320 adds information representing the region Bn (e.g., coordinate corresponding to the four corners in the region) to the image information (refer to FIG. 2) so as to update the image information. The overlap calculation unit 2320 stores the updated image information into the memory unit 2200.

Referring back to FIG. 1, a configuration example of the image processing system will be further described. The determining unit 2400 includes an image blur determining unit 2410 and an overlap determining unit 2420. The execution unit 2500 includes a correction unit 2510, a measurement unit 2520 and a guide unit 2530. The correction unit 2510 includes a first correction unit 2511 and a second correction unit 2512.

The image blur determining unit 2410 receives a value representing the degree of image blur and the image information from the overlap calculation unit 2320. The image blur determining unit 2410 determines a quality of the image based on the degree of image blur and decides a process to be executed by the execution unit 2500 depending on the determination result.

The image blur determining unit 2410 outputs a trigger signal (hereinafter referred to as first trigger signal) requesting a retake of images without blur to the guide unit 2530, when the value representing the degree of image blur satisfies a predetermined first condition. The first condition is a condition where a quality of image is low (the degree of image blur is large) such that a surface shape cannot be measured accurately even if image correction is performed.

The image blur determining unit 2410, when a value representing the degree of image blur does not satisfy the first condition and satisfies a predetermined second condition, transfers the value representing the degree of image blur, an image number of image information and a pixel value information to the first correction unit 2511, in order to execute a process to correct the image depending on a value representing the quality of the image. The second condition is a condition where a quality of image is high enough (a degree of image blur is small) to accurately measure a surface shape when correcting the image using a predetermined first filter.

The image blur determining unit 2410, when a value representing the degree of image blur does not satisfy the first condition and the second condition, and satisfies a predetermined third condition, transfers the value representing the degree of image blur, an image number of the image information and pixel value information to the second correction unit 2512, in order to execute a process to correct the image depending on a value representing the quality of the image. The third condition is a condition that the image quality is high (degree of image blue is small) enough to accurately measure the surface shape of the object when correcting the image using a predetermined second filter.

Also, the image blur determining unit 2410 outputs an image number of the image information and the pixel value information to the second correction unit 2520, when none of the first, the second and the third conditions is satisfied.

The overlap determining unit 2420 receives a value representing an overlap ratio between images and image information from the overlap calculation unit 2320. The overlap determining unit 2420 determines the quality of the image based on the overlap ratio, i.e., extent of overlap between images and decides a process to be executed by the execution unit 2500 depending on the determination result.

The overlap determining unit 2420 outputs a trigger signal (hereinafter referred to second trigger signal) to the guide unit 2530 when a value representing an overlap ratio between images satisfies a predetermined fourth condition. The second trigger signal prompts a user operating the imaging device 1000 while going around the object, to retake images at a previous position. The fourth condition is a condition where images are not overlapped sufficiently such that the surface shape of an object cannot be accurately measured and the quality of the image is low (the overlap ratio between images is low).

Meanwhile, the overlap determining unit 2420 outputs an image number of the image information (refer to FIG. 2) and the pixel value information to the measurement unit 2520, when a value representing an overlap ratio between images does not satisfy the fourth condition, i.e., images are overlapped sufficiently such that the surface shape of an object can be accurately measured and the quality of the image is high (the overlap ratio between images is high).

The first correction unit 2511 corrects the pixel value information of the image information by using a predetermined first filter. Since the first correction unit 2511 corrects the pixel value information (information of a pixel value of an image that constitutes a stereo image which is two dimensional image), compared to a case where information of a pixel value of three dimensional image is corrected, correction can be performed with a smaller amount of processing. The first correction unit 2511 outputs the image number and the pixel value information which is corrected by using the predetermined first filter to the measurement unit 2520.

The second correction unit 2512 corrects the pixel value information of the image information by using a predetermined second filter. Since the second correction unit 2512 corrects the pixel value information (information of a pixel value of an image that constitutes a stereo image which is a two dimensional image), compared to a case where information of a pixel value of a three dimensional image is corrected, correction can be performed with a smaller amount of processing. The second correction unit 2512 outputs the image number and the pixel value information which is corrected by using the predetermined second filter to the measurement unit 2520.

The measurement unit 2520 measures a surface shape of an object captured in the image, based on the image number of the image information and the pixel value information, when the image number of the image information and the pixel value information (refer to FIG. 2) transmitted from the image blur determining unit 2410 or the overlap determining unit 2420 are received. Meanwhile, the measurement unit 2520 measures a surface shape of an object captured in the image, based on the image number of the image information and the pixel value information which is corrected, when the image number of the image information and the pixel value information which is corrected, transmitted from the first correction unit 2511 or the second correction unit 2512 are received.

The measurement unit 2520 measures a surface shape of an object based on, for example, phase-only correlation (POC) and generates a depth map showing a surface shape of the measured object. Also, the measurement unit 2520 generates a mesh model (three dimensional model) based on the depth map and outputs the information representing the generated mesh mode to the output device 3000.

The guide unit 2530 outputs, when the first trigger signal transmitted from the image blur determining unit 2410 is received, information requesting a retake of images without blur, to the output device 3000 in an image format. Also, the guide unit 2530 may output information requesting a retake of images without blur, to the output device 3000 in a sound format, when the first trigger signal transmitted from the image blur determining unit 2410 is received.

The guide unit 2530 outputs information to the output device 3000 in an image format when the second trigger signal transmitted from the overlap determining unit 2420 is received. The information prompts a user operating the imaging device 1000 while going around the object, to retake images at a previous position. Moreover, the guide unit 2530 may output information to the output device 3000 in a sound format, when the second trigger signal transmitted from the overlap determining unit 2420 is received, in which the information prompts a user operating the imaging device 1000 while going around the object to retake images at a previous position.

The output device 3000 includes a display unit 3100 and a speaker unit 3200 (sound output unit). The display unit 3100 receives information representing a mesh model which is transmitted from the measurement unit 2520. The display unit 3100 displays an image showing a mesh model (three-dimensional shape model) based on the information representing the mesh model.

The display unit 3100 receives information requesting a retake of images in an image format, which is transmitted from the guide unit 2530. The display unit 3100 displays information requesting a retake of images (e.g., character string "Please avoid image blur and retake the images") in an image format. According to the guidance, the user operating the imaging device 1000 avoids image blur and retakes the images, whereby images corresponding to the object can be captured.

The display unit 3100 receives information requesting a retake of the images at a previous position, which is transmitted from the guide unit 2530. The display unit 3100 displays, with an image format, the information requesting a retake of the images at an previous position (e.g., Please retake images at previous position). The user operating the imaging device 1000 while going around the object retakes images at a previous position, whereby the overlap ratio between the captured images can be increased.

The speaker unit 3200 receives information, in a sound format, requesting a retake of images, which is transmitted from the guide unit 2530. The speaker unit 3200 produces sound based on the information requesting a retake of images (e.g., sound "Please avoid image blur and retake images). The user operating imaging device 1000 follows the guidance to avoid image blur and retake images. Then, the image of the object in which the image blur is suppressed can be captured.

The speaker unit 3200 produces sound based on information requesting a retake of the images at a previous position (e.g., Please retake images at previous position). The user operating the imaging device 1000 while going around the object retakes images at a previous position, whereby the overlap ratio between the captured images can be increased.

Figure 4:
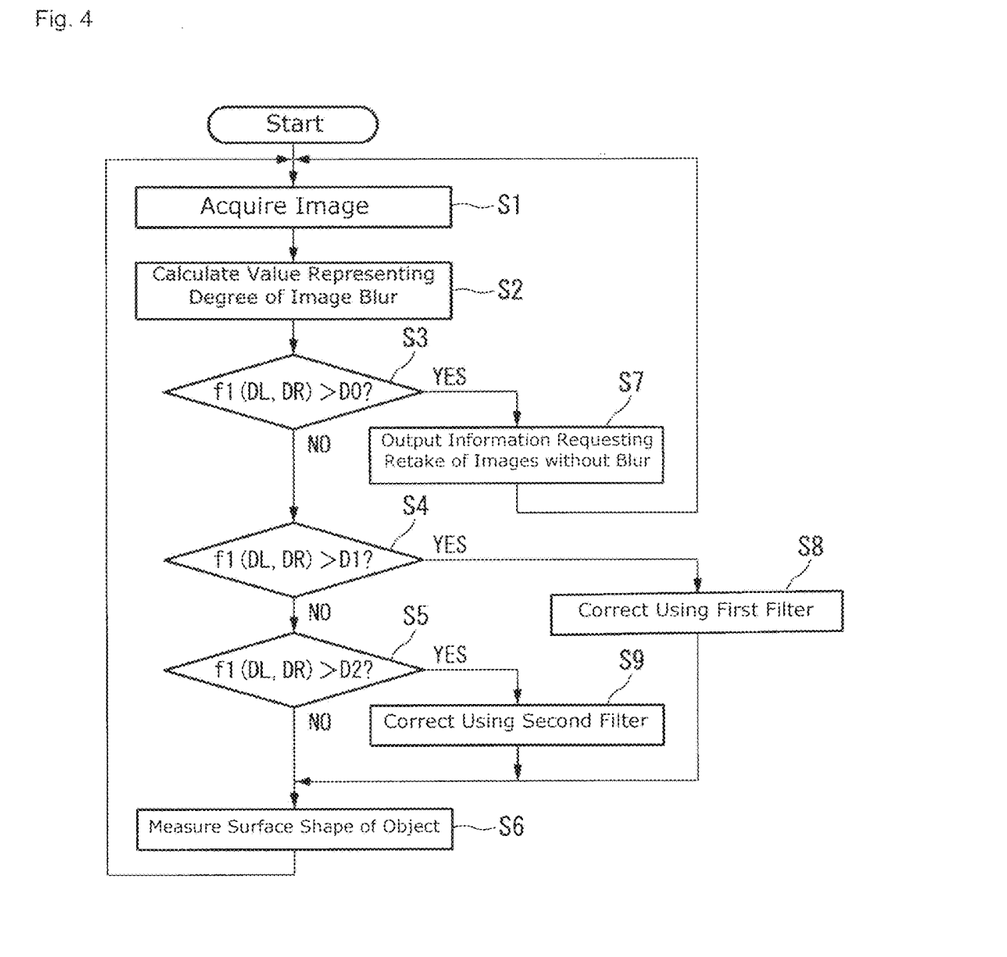
FIG. 4 is a flowchart showing an operating procedure that determines a process based on a degree of image blur according to an embodiment of the present invention.

Next, an example of an operating procedure that determines a process based on a quality of image will be described. FIG. 4 is a flow chart showing an operating procedure that determines a process based on a degree of image blur. This operating procedure may be executed every time when the stereo image is captured.

According to the following explanation, among the threshold value D1 and the threshold value D2, the threshold value D0 is the largest value and the threshold value D2 is the smallest value. In the following, the degree of image blur in the left-side stereo image is expressed as DL and the degree of image blur in the right-side stereo image is expressed as DR.

(Step S1)
The acquiring unit 2100 acquires a stereo image.
(Step S2)
The image blur calculation unit 2310 calculates a value representing the degree of image blur in the left-side stereo image DL and a value representing the degree of image blur in the right-side stereo image DR.
(Step S3)
The image blur determining unit 2410 determines whether or not a value of an evaluation equation f1 (DL, DR) exceeds the threshold value D0. Here, for example, a value of the evaluation equation f1 (DL, DR) may be set to be the smaller value among a value representing DL or a value representing DR. When a value of the evaluation equation f1 (DL, DR) exceeds the threshold value D0 (step S3: Yes), the image blur determining unit 2410 advances the process to step S7. When a value of the evaluation equation f1 (DL, DR) is less than or equal to the threshold value D0 (step S3: No), the image blur determining unit 2410 advances the process to step S4.

(Step S4)
The image blur determining unit 2410 determines whether or not a value of the evaluation equation f1 (DL, DR) exceeds the threshold value D1. When the value of the evaluation equation f1 (DL, DR) exceeds the threshold value D1 (step S4: Yes), the image blur determining unit 2410 advances the process to step S8. When the value of the evaluation equation f1 (DL, DR) is less than or equal to the threshold value D1 (step S4: No), the image blur determining unit 2410 advances the process to step S5.

(Step S5)
The image blur determining unit 2410 determines whether or not a value of the evaluation equation f1 (DL, DR) exceeds the threshold value D2. When the value of the evaluation equation f1 (DL, DR) exceeds the threshold value D2 (step S5: Yes), the image blur determining unit 2410 advances the process to step S9. When the value of the evaluation equation f (DL, DR) is less than or equal to the threshold value D2 (step S5: No), the image blur determining unit 2410 advances the process to step S6.

(Step S6)
The measurement unit 2520 measures a surface shape of the object captured in the stereo image. The measurement unit 2520 measures the surface shape of the object by, for example, phase-only correlation. The measurement unit 2520 generates a depth map showing the surface shape of the object based on the measurement result. The measurement unit 2520 generates a mesh model based on the depth map and outputs pixel value information representing the generated mesh model to a display unit 3100 of the output unit 3000.

(Step S7)
The image blur determining unit 2410 controls the guide unit 2530 so as to output the information requesting a retake of images as information being provided to a user of the imaging device 1000, to at least either the display unit 3100 or the speaker unit 3200 of the output unit 3000. The guide unit 2530 may output, as information requesting a retake of images, information prompting a user to avoid image blur and retake the images. The image blur determining unit 2410 returns the process to step S1.

(Step S8)
The image blur determining unit 2410 outputs a stereo image to the first correction unit 2511. The first correction unit 2511 corrects the stereo image by using the first filter and outputs the corrected stereo image to the measurement unit 2520. An image filter such as Laplacian filter or Sobel filter serves as the first filter. The execution unit 2500 advances the process to step S6.

(Step S9)
The image blur determining unit 2410 outputs a stereo image to the second correction unit 2512. The second correction unit 2512 corrects the stereo image by using the second filter and outputs the corrected stereo image to the measurement unit 2520. The second filter may be an image filter that is the same as the first filter. A kernel size of the second filter (predetermined coefficient α×D2) may be different from the kernel size of the first filter (predetermined coefficient α×D1). The execution unit 2500 advances the process to step S6.

Figure 5:
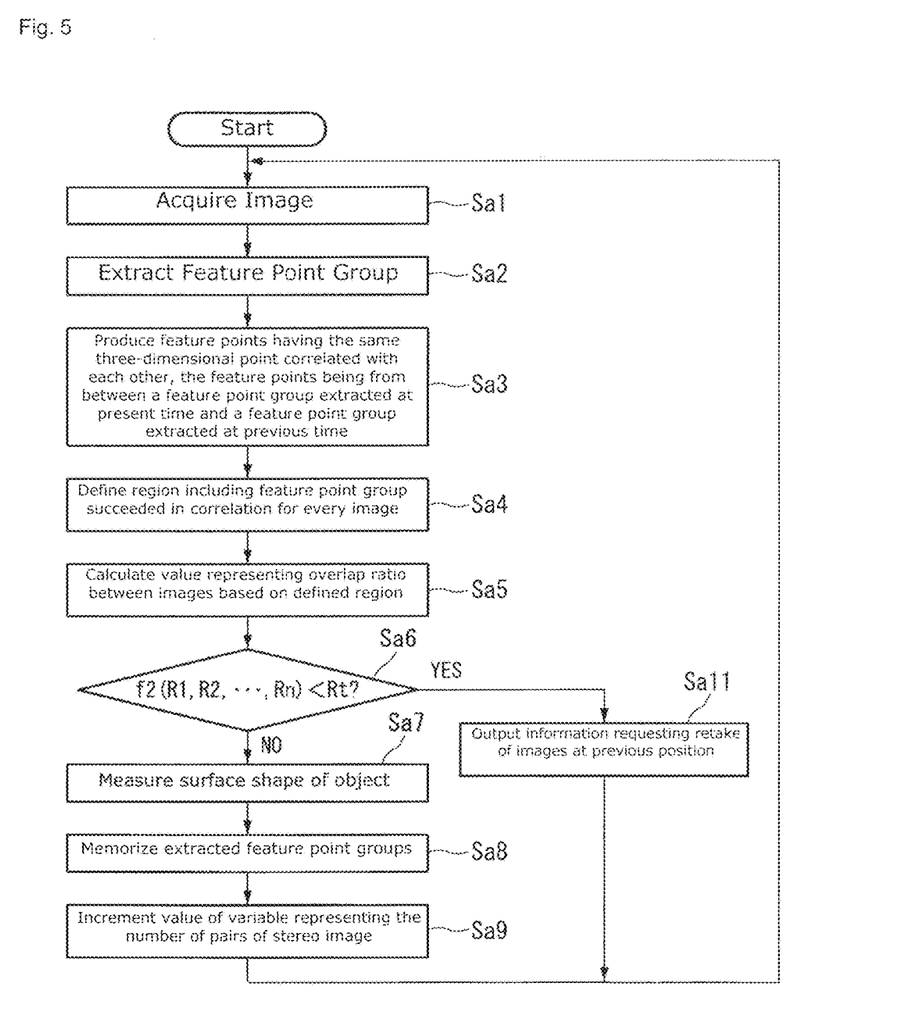
FIG. 5 is a flowchart showing an operating procedure that determines a process based on an overlap ratio between images according to an embodiment of the present invention.

FIG. 5 is a flowchart showing an operating procedure that determines a process based on an overlap ratio between images. This operating procedure may be executed every time a stereo image is captured.

(Step Sa1)

The acquiring unit 2100 acquires a stereo image.

(Step Sa2)

The overlap calculation unit 2320 extracts a feature point group FN from at least either the left-side image of the stereo image or the right-side image of the stereo image.

(Step Sa3)

The overlap calculation unit 2320 produces feature points having the same three-dimensional point in the captured stereo image correlated with each other in every image, the feature points being from between a feature point group FN extracted from a stereo image acquired at the present time and a feature point group F (n−1) extracted from a stereo image group Sp (n−1), where n represents 1 to N, acquired at the previous time. In other words, the overlap calculation unit 2320 makes feature points correlated with each other, which are two dimensional images.

(Step Sa4)

The overlap calculation unit 2320 defines, for every image, a region Bn including a feature point group Mn which is succeeded in the correlation.

(Step Sa5)

The overlap calculation unit 2320 calculates, for every image, a value Rn representing an overlap ratio between images based on the defined region Bn.

(Step Sa6)

The overlap determining unit 2420 determines whether or not an evaluation equation f2 (R1, R2, . . . , Rn) has a value less than a threshold value Rt. For example, the value of the evaluation equation f2 (R1, R2, . . . , Rn) may be the maximum value among values R1, R2, . . . , Rn which represent the overlap ratio. The threshold value Rt may be a fixed value or a value determined depending on the number of pairs N of the stereo image.

When a value of the evaluation equation f2 (R1, R2, . . . , Rn) is less than the threshold value Rt (step Sa6: Yes), the overlap determining unit 2420 advances the process to step Sa11. In step Sa11, the process outputs information requesting retake of images at previous position and returns to step Sa1. Meanwhile, when a value of the evaluation equation f2 (R1, R2, . . . , Rn) is more than or equal to the threshold value Rt (step Sa6: No), the overlap determining unit 2420 advances the process to step Sa7.

(Step Sa7)

The measurement unit 2520 measures a surface shape of the object captured in the stereo image based on the stereo image. The measurement unit 2520 measures the surface shape of the object by using, for example, phase-only correlation. The measurement unit 2520 generates a depth map based on the measurement result. The measurement unit 2520 generates a mesh model based on the depth map and outputs pixel value information representing the generated mesh model to the display unit 3100 of the output device 3000.

(Step Sa8)

The overlap calculation unit 2320 stores information representing feature point groups F1 to FN into the memory unit 2200.

(Step Sa9)

The overlap calculation unit 2320 increments a value of a variable representing the number of pairs N of the stereo image. The value of the variable represents that the number of pairs of the stereo image is incremented from the previous caption.

As described above, the image processing device 2000 includes the acquiring unit 2100 that acquires a plurality of images in which an object is captured from multiple directions, the calculation unit 2300 that calculates a value representing a quality of image, the determining unit 2400 that measures surface shape of the object depending on a value representing a quality of the image and the execution unit 2500 that executes prescribed processes.

The image processing system includes the imaging device that outputs a plurality of images in which an object is captured from multiple directions, an image processing device 2000, and the output device 3000.

An image processing method is an image processing method applied to the image processing device and includes a step for calculating, by the calculation unit 2300, a value representing a quality of a plurality of images where an image is captured from multiple directions; a step for determining, by the determining unit 2400, a process for measuring a surface shape of the object depending on a value representing a quality of the image; and a step for executing a prescribed process by the execution unit 2500.

The image processing program configures a computer execute a process for calculating a value representing a quality of a plurality of images where an image is captured from multiple directions; a process for determining a process for measuring a surface shape of the object depending on a value representing a quality of the image; and a process for executing a prescribed process.

According to this configuration, the determining unit 2400, depending on a value representing a quality of a plurality of images where an image is captured from multiple directions, determines a process for measuring a surface shape of the object. In other words, the determining unit 2400 determines a process for measuring a surface shape of the object depending on a quality of multiple viewpoint images. The execution unit 2500 executes the process determined by the determining unit 2400.

As a result, the image processing device 2000, the image processing system, and the image processing program according to the present embodiment make it possible to avoid unnecessary number of images in the multiple view point images.

For example, since the image processing device 2000, the image processing system, and the image processing program according to the present embodiment apply appropriate correction depending on a value representing a quality of the image, to an image which has been unable to be used for measurement of a surface shape of an object, it is thereby possible to use the image for measuring the surface shape of the image (re-use images which have been discarded). Hence, it is possible to avoid unnecessary number of images in the multiple view point images.

Further, for example, the image processing device 2000, the image processing system, the image processing program according to the present embodiment prompts the user of the imaging device 1000 to retake images when a stereo image having insufficient quality (e.g., degree of image blur is large, overlap is not enough) is captured. Thus, the image processing device 2000, the image processing system, the image processing program according to the present embodiment capture images capable of being used for measuring a surface shape (e.g., degree of image blur is small, overlap is enough) more quickly. Hence, it is possible to avoid unnecessary number of images in the multiple view point images.

Specifically, the image processing device 2000, the image processing system, and the image processing program according to the present embodiment immediately determine whether or not an image capture has been properly performed. Moreover, the image processing device 2000, the image processing system, the image processing program according to the present embodiment immediately notify the user of the required method for retaking images when the image capture is improper. Furthermore, the image processing device 2000, the image processing system, and the image processing program according to the present embodiment are able to prevent failure of measurement due to failure of repeated image capture occurs so that the measurement operation can be optimized.

The determining unit 2400 may make the execution unit 2500 execute a process to correct images depending on the value representing a quality of image, when a value representing a quality of image satisfies a predetermined quality condition (e.g., a condition where the image quality is high such that surface shape can be accurately measured if an image correction is performed by using a filter). The determining unit 2400 may make the execution unit 2500 output information requesting a retake of images depending on a value representing a quality of the image, when a value representing a quality of the image does not satisfy a predetermined condition (e.g., a condition where images are overlapped sufficiently such that the surface shape of the object can be measured accurately).

The calculation unit 2300 may calculate a value representing degree of image blur to be a value representing a quality of the image. Also, the determining unit 2400 may determine a filtering process applied to the image based on a value representing degree of image blur and the execution unit 2500 may apply the filtering process to the image.

The calculation unit 2300 may calculate a value representing an overlap ratio between images (e.g., a ratio where an area defined on an image occupies an area of the frame in the image) to be a value representing a quality of the image.

As described, the embodiments of the present invention are described in detail. The specific configurations are not limited to the above-described embodiments. However, various designs may be included in the specific configurations without departing the scope of the present invention.

The program for implementing the above-described respective devices may be stored on a computer-readable recording media. The program stored on the recording media may be loaded into a computer system and executed, thereby performing the execution processes. It should be noted that "computer system" may include an operating system (OS) and hardware devices such as peripheral devices.

Further, "computer system" may include an environment providing a website environment (display environment). "The computer-readable recording media" is a memory device such as a flexible disk, a magneto-optical disk, ROM, a writable non-volatile memory such as a flash memory, a portable media such as CD-ROM, or a hard disk drive.

Moreover, "the computer-readable recording media" may include a device capable of holding a program for a certain period of time such as a volatile memory (e.g., DRAM: Dynamic Random Access Memory) disposed in a computer system which is a server or a client when a program is transmitted thereto via the network, e.g., internet or communication line such as telephone line. Further, the above-described program may be transferred to other computer system from the computer system in which the program is stored in a memory device or the like, via a transmission media or transmission waves in the transmission media. It should be noted that the "transmission media" through which the program is transferred is defined as a media having a function of transferring information, e.g., a network (communication network) such as Internet or a communication line such as telephone line. The above-described program may implement a part of the above-described functions. Further, the above-described program may be a so-called difference file (difference program) in which the above-described function can be accomplished by combining programs stored in the computer system in advance.

In case where imaging is not performed properly, the user has to retake multiple view point images. As a result of retaking these, a problem arises that the number of multi-point view images may increase in an image processing device (stereo camera).

The present invention has been achieved in light of the above-described circumstances and its object is to provide an image processing device capable of avoiding the need for an unnecessary number of multiple view point images, an image processing system to and an image processing program.

An image processing device according to a first aspect of the present invention includes an acquiring unit that acquires a plurality of images in which an object is captured from multiple directions; a calculation unit that calculates a value representing a quality of the images; a determining unit that determines a process for measuring a surface shape of the object depending on the quality of the images; and an execution unit that executes the process which is determined.

In the image processing device according to the first aspect of the present invention, the determining unit may preferably make the execution unit execute a process to correct the images depending on the value representing the quality of the images, when the value representing the quality of the images satisfies a predetermined quality condition.

In the image processing device according to the first aspect of the present invention, the determining unit may preferably make the execution unit output information requesting a retake of the images depending on the value representing the quality of the images, when the value representing the quality of the images does not satisfy a predetermined quality condition.

In the image processing device according to the first aspect of the present invention, the calculation unit may preferably calculate a value representing a degree of image blur to be the value representing the quality of the images.

In the image processing device according to the first aspect of the present invention, the determining unit may preferably determine a filtering process applied to the images based on the value representing degree of image blur; and the execution unit may preferably apply the filtering process which is determined to the images.

In the image processing device according to the first aspect of the present invention, the calculation unit may preferably calculate a value representing an overlap ratio between the images to be the value representing the quality of the images.

An image processing system according to a second aspect of the present invention includes an imaging device that outputs a plurality of images in which an object is captured from multiple directions; the image processing device according to the first aspect and an output device that outputs a result which the image processing device executes.

An image processing method according to a third aspect of the present invention is an image processing method applied to an image processing device. The image processing method includes steps of calculating, by a calculation unit, a value representing a quality of a plurality of images in which an object is captured from multiple directions; determining, by a determining unit, a process for measuring a surface shape of the object depending on the value representing the quality of the images; and executing, by an execution unit, the process which is determined.

An image processing program according to a fourth aspect of the present invention configures a computer to execute a process that calculates a value representing a quality of a plurality of images in which an object is captured from multiple directions; a process that determines a process for measuring a surface shape of the object depending on the value representing the quality of the images; and a process that executes the process which is determined.

According to the aspects of the present invention, the determining unit determines a process for measuring a surface shape of the object depending on the quality of the multiple viewpoint images. The execution unit executes the process which is determined.

Thus, an image processing device, an image processing system, an image processing method and an image processing program is able to avoid having unnecessary number of images in the multiple view point images.

DESCRIPTION OF REFERENCE NUMERALS

1000: imaging device,
2000: image processing device
2100: acquiring unit
2200: memory unit
2300: calculation unit
2310: image blur calculation unit
2320: overlap calculation unit
2400: determining unit
2410: image blur determining unit
2420: overlap determining unit 2420
2500: execution unit
2510: correction unit
2511: first correction unit
2512: second correction unit
2520: measurement unit
2530: guide unit
3000: output device
3100: display device
3200: speaker unit Obviously, numerous modifications and variations of the present invention are possible in light of the above teachings. It is therefore to be understood that within the scope of the appended claims, the invention may be practiced otherwise than as specifically described herein.

What is claimed is:

1. An image processing device, comprising:
a processor configured to
acquire a plurality of images in which an object is captured from multiple directions,
calculate a value representing a suitability of the images,
determine a process enabling a measurement of a surface shape of the object depending on the suitability of the images, and
execute the process which is determined,
wherein the processor is further configured to calculate the value representing the suitability of the images by being configured to calculate a value representing an overlap ratio between the images, and
wherein the processor is further configured to determine a filtering process applied to the images based on a value representing degree of image blur, a different filtering process being applied for a different value representing the degree of image blur.

2. The image processing device according to claim 1, wherein the processor is further configured to output information requesting a retake of the images depending on the value representing the suitability of the images, when the value representing the suitability of the images does not satisfy a predetermined suitability condition.

3. The image processing device according to claim 1, wherein the processor is further configured to calculate the value representing the suitability of the images by being configured to calculate the value representing the degree of image blur.

4. The image processing device according to claim 3, wherein the processor is further configured to
apply the filtering process which is determined to the images.

5. An image processing system, comprising:
an imaging device configured to output a plurality of images in which an object is captured from multiple directions;
the image processing device according to claim 1; and
an output device configured to output a result executed by the image processing device.

6. A method of processing an image, comprising:
calculating, by a processor, a value representing a suitability of a plurality of images in which an object is captured from multiple directions;
determining, by the processor, a process enabling a measurement of a surface shape of the object depending on the value representing the suitability of the images; and
executing, by the processor, the process which is determined by the determining,
wherein the calculating the value representing the suitability of the images further includes calculating a value representing an overlap ratio between the images, and
wherein the method further comprises determining a filtering process applied to the images based on a value representing degree of image blur, a different filtering process being applied for a different value representing the degree of image blur.

7. A non-transitory computer-readable medium including computer executable instructions, wherein the instructions, when executed by a computer, cause the computer to perform a method of processing an image, the method comprising:
calculating a value representing a suitability of a plurality of images in which an object is captured from multiple directions;
determining a process enabling a measurement of a surface shape of the object depending on the value representing the suitability of the images; and
executing the process which is determined by the determining,
wherein the calculating the value representing the suitability of the images further includes calculating a value representing an overlap ratio between the images, and
wherein the method further comprises determining a filtering process applied to the images based on a value representing degree of image blur, a different filtering process being applied for a different value representing the degree of image blur.

8. The method according to claim 6, further comprising outputting information requesting a retake of the images depending on the value representing the suitability of the images, when the value representing the suitability of the images does not satisfy a predetermined suitability condition.

9. The method according to claim 6, wherein the calculating the value representing the suitability of the images further comprises calculating the value representing the degree of image blur.

10. The method according to claim 9, further comprising:
applying the filtering process which is determined to the images.

11. The non-transitory computer readable according to claim 7, wherein the method further comprises outputting information requesting a retake of the images depending on the value representing the suitability of the images, when the value representing the suitability of the images does not satisfy a predetermined suitability condition.

12. The non-transitory computer readable according to claim 7, wherein the calculating the value representing the suitability of the images further comprises calculating the value representing the degree of image blur.

13. The non-transitory computer readable according to claim 12, wherein the method further comprises:
applying the filtering process which is determined to the images.

14. The image processing device according to claim 1, wherein the overlap ratio represents degree of overlapping between the images of the object, which are images of a same object.

15. The image processing device according to claim 1, wherein the processor is further configured to determine the process enabling the measurement of the surface shape of the object depending on the value representing the suitability of the images by being configured to determine, based on the value representing the suitability of the images, whether the images are useable for generation of a three-dimensional model.

16. The method according to claim 6, wherein the overlap ratio represents degree of overlapping between the images of the object, which are images of a same object.

17. The method according to claim 6, wherein the determining the process enabling the measurement of the surface shape of the object depending on the value representing the suitability of the images further comprises determining, based on the value representing the suitability of the images, whether the images are useable for generation of a three-dimensional model.

18. The image processing device according to claim 1, wherein the processor is further configured to measure the surface shape of the object based on phase-only correlation (POC) and generate a depth map indicating a surface shape of the object.

* * * * *